(12) United States Patent
Li

(10) Patent No.: US 6,836,576 B2
(45) Date of Patent: Dec. 28, 2004

(54) POLARIZATION RECOVERY SYSTEM USING LIGHT PIPES

(75) Inventor: Kenneth K. Li, Arcadia, CA (US)

(73) Assignee: Wavien, Inc., Santa Clarita, CA (US)

( * ) Notice: Subject to any disclaimer, the term of this patent is extended or adjusted under 35 U.S.C. 154(b) by 166 days.

(21) Appl. No.: 10/361,029

(22) Filed: Feb. 10, 2003

(65) Prior Publication Data

US 2003/0179977 A1 Sep. 25, 2003

Related U.S. Application Data

(60) Provisional application No. 60/354,522, filed on Feb. 8, 2002.

(51) Int. Cl.[7] .................................................. G02B 6/27
(52) U.S. Cl. ......................................... 385/11; 385/146
(58) Field of Search ........................... 385/11, 146, 133; 349/62, 5, 9, 96, 98; 353/20; 359/485, 489, 494, 495, 497; 362/551, 561, 19; 313/112

(56) References Cited

U.S. PATENT DOCUMENTS

| | | | |
|---|---|---|---|
| 5,301,030 A | 4/1994 | Ko | |
| 5,303,083 A | 4/1994 | Blanchard et al. | |
| 5,434,407 A | 7/1995 | Bauer et al. | |
| 5,491,525 A | 2/1996 | Yamasaki et al. | |
| 5,513,023 A | 4/1996 | Fritz et al. | |
| 5,601,351 A | 2/1997 | van den Brandt | |
| 5,625,738 A | 4/1997 | Magarill | |
| 5,712,694 A | 1/1998 | Taira et al. | |
| 5,749,642 A | 5/1998 | Kimura et al. | |
| 5,751,480 A | 5/1998 | Kitagishi | |
| 5,786,873 A | 7/1998 | Chiu et al. | |
| 5,884,991 A | 3/1999 | Levis et al. | |
| 5,975,703 A | 11/1999 | Holman et al. | |
| 6,053,615 A | 4/2000 | Peterson et al. | |
| 6,104,454 A | 8/2000 | Hiyama et al. | |
| 6,139,157 A | 10/2000 | Okuyuma | |
| 6,227,682 B1 | 5/2001 | Li | |
| 6,247,814 B1 | 6/2001 | Lin | |
| 6,307,601 B1 | 10/2001 | Kakuda et al. | |
| 6,587,269 B2 * | 7/2003 | Li | 359/497 |
| 2003/0007130 A1 * | 1/2003 | Maximus | 353/20 |
| 2004/0090763 A1 * | 5/2004 | Li et al. | 362/19 |

FOREIGN PATENT DOCUMENTS

| | | |
|---|---|---|
| CA | 2290860 A1 | 5/2000 |
| DE | 1 161 826 B | 1/1964 |
| EP | 0 584 802 A1 | 3/1994 |
| EP | 0 691 552 A2 | 1/1996 |
| JP | 9-326205 A A3 | 12/1997 |
| WO | WO 93/24857 A1 | 12/1993 |
| WO | WO 95/27919 A2 A3 | 10/1995 |
| WO | WO 00/67057 A1 | 11/2000 |
| WO | WO 01/02774 A1 | 1/2001 |

* cited by examiner

Primary Examiner—Rodney Bovernick
Assistant Examiner—Mike Stahl
(74) Attorney, Agent, or Firm—Rothwell, Figg, Ernst & Manbeck, PC

(57) ABSTRACT

A polarization recovery system using light pipes has a reflector having a first and a second focal points. A source of electro-magnetic radiation is disposed proximate to the first focal point of the reflector to emit rays of light that reflect from the reflector and converge substantially at the second focal point. A light pipe having an input surface with a first transmissive portion disposed proximate to the second focal point and a second reflective portion disposed distal to the second focal point and an output surface collects and transmits substantially all of the light. The output surface has a radius of curvature substantially equal to a length of the light pipe, a first focal area proximate to the first transmissive portion and a second focal area proximate to the second reflective portion. A polarizer applied to the output surface transmits the light of a first polarization and reflects the light of a second polarization toward the second reflective area, and the light of the second polarization is substantially reflected by the second reflective area toward the output surface.

37 Claims, 14 Drawing Sheets

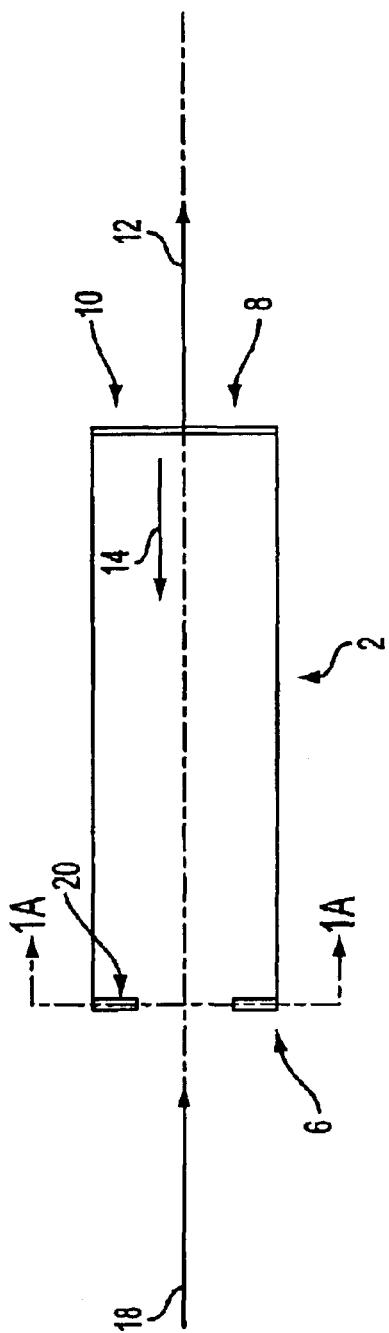
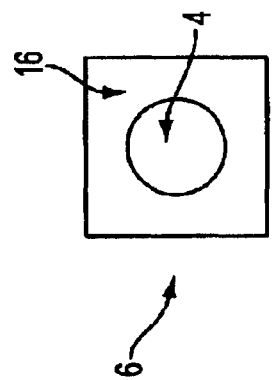
FIG. 1
(CONVENTIONAL ART)
FIG. 1A
(CONVENTIONAL ART)

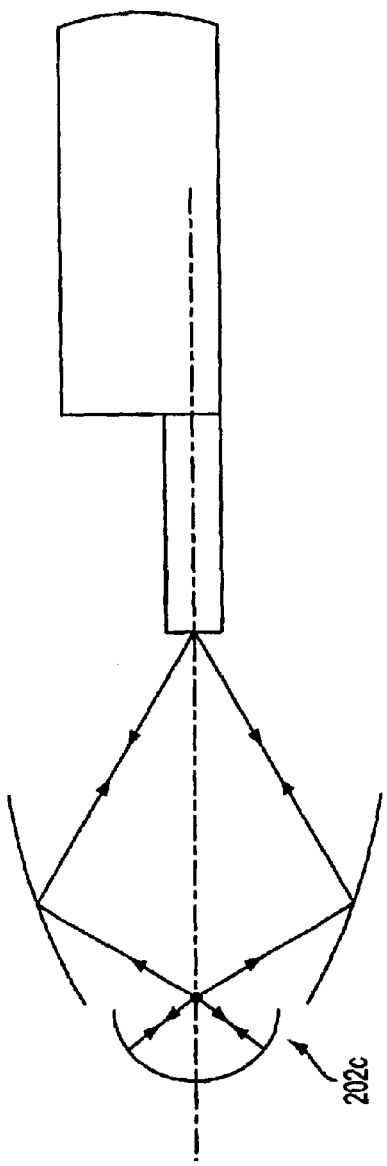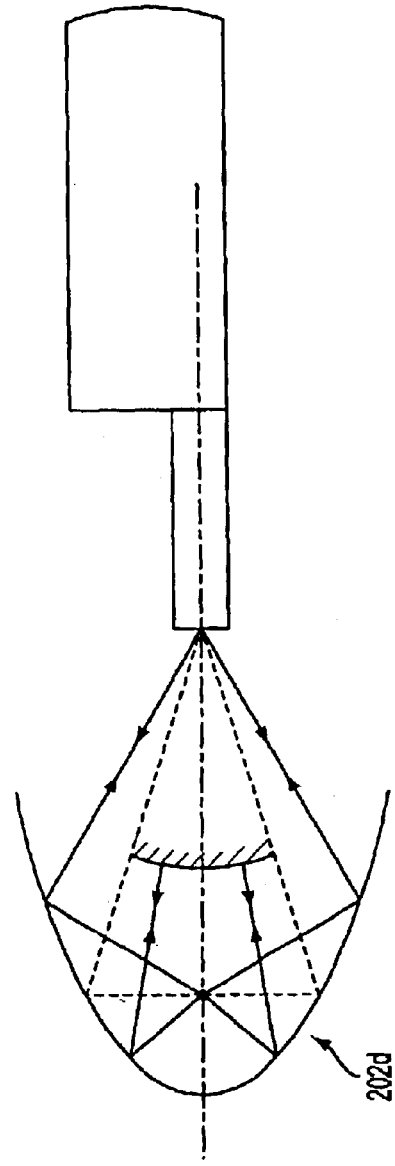
FIG. 7C
FIG. 7D

POLARIZATION RECOVERY SYSTEM USING LIGHT PIPES

CROSS-REFERENCE TO RELATED APPLICATION

This application claims priority to Provisional Application Ser. No. 60/354,522, filed Feb. 8, 2002, the disclosure of which is incorporated by reference.

BACKGROUND OF THE INVENTION

1. Field of Invention

This invention relates to the recovery of light in projection systems that might otherwise be wasted.

2. Description of the Related Art

Projection displays work by projecting light onto a screen. The light is arranged in patterns of colors or brightness and darkness or both. The patterns are viewed by a viewer who assimilates them by associating the patterns with images with which the viewer may already be familiar such as characters or faces. The patterns may be formed in various ways. One way is by modulating a beam of light with a stream of information.

Polarized light may be modulated by filtering it with polarized filters. An LCD imager may be used to perform the modulation in LCD-type projection displays. The LCD imager may include pixels that may be modulated by altering their polarization to either match the polarization of the incident light or differ from it. The pixels will pass light, in general, if their polarization matches the polarization of the incident light.

The light input to the LCD imager is polarized such that when the LCD pixels are modulated the polarization of the selected pixels is changed, and when the light output from the imager is analyzed by another polarizer, the selected pixels will be darkened.

If the polarization of the pixels is modulated with information, such as a pattern with which a viewer may be familiar, the information may be projected onto a screen as the presence or absence of light. When the pixels are modulated with information forming a pattern with which a viewer may be familiar, a viewer may recognize the pattern projected onto the screen.

Only half of the light from the source will be of the correct polarization to input to the LCD imager after the light is polarized. The other half will be of the incorrect polarization and hence unusable directly. It would be desirable if light of the wrong polarization could be recovered and used by converting its polarization to the correct type.

Various schemes have been developed to convert the incorrectly polarized light to the correct polarization so that it too may be used. A common scheme uses an array of lenses and an array of polarization beam splitters (PBS). These systems usually focus the output of a light source with a parabolic reflector such that light is nearly parallel. The beam is split into many sections by a lens array and each section is refocused by another lens array into the PBS array. The light output from the PBS array will then be linearly polarized and focused into the target.

A straight light pipe (SLP) may be used to homogenize a beam of light focused by, e.g. an elliptical reflector as described in U.S. Pat. No. 6,139,157. Multiple images will be formed when viewed from the output of the SLP due to the multiple reflections of the focused light by the sidewalls of the SLP. As a result, the focused light and its reflections can be imaged onto the lens array and PBS array in a manner similar to the case of the parabolic reflector.

Light pipe 2 shown in FIG. 1 may be used with a 1:1 dual paraboloid coupling system. Light of an improper polarization may be recovered inside light pipe 2. Light pipe 2 may be either hollow or solid, and has an opening 4 at an input end 6 of light pipe 2, as shown in FIG. 1A. The remainder of input end 6 is coated with a reflective surface 16. A polarizer 8 is placed at an output end 10 of light pipe 2.

The area of opening 4 is generally limited to a fraction of the area of a cross-section of light pipe 2. The area of opening 4 is commonly less than or equal to half of the area of a cross-section of light pipe 2. A fraction of one half will be used in the following descriptions.

Randomly polarized light 18 enters light pipe 2 at opening 4 and passes to polarizer 8. Light of a first polarization 12 is transmitted at polarizer 8 while light of a second polarization 14 is reflected back toward input end 6 of light pipe 2. A portion of the light of second polarization 14 exits opening 4 at input end 6 of light pipe 2, while the remainder is reflected and randomized by reflective surface 16 and directed toward polarizer 8 again.

If any of the light is reflected at polarizer 8 again, however, it will repeat the reflection process again and another part of the light will be recovered. The process will repeat itself over and over until the light is either dissipated or transmitted, and contribute to the final output of light of first polarization 12 at output end 10.

One problem with this configuration arises from the fact that about half of the reflected light of second polarization 14 is lost through opening 4 at input end 6 of light pipe 2 during each pass. Therefore, if an efficiency of polarizer 8 is 50%, the reflectivity of reflective surface 16 at input end 6 is 100%, and randomly polarized light 18 is truly randomly polarized, the output from the first pass will be about one-half of the input light. The other half of the light will be reflected back to input end 6, where half of that will pass through opening 4 and the other half will be reflected by reflective surface 18. Only the half reflected by reflective surface 18 will reach polarizer 8 again, and only half of that will exit as light of first polarization 12. The overall second pass efficiency will thus be ⅛. The output for the third pass will be 1/32, and so on. The sum of this geometric series is ⅔, which is 66%.

Reflective surface 16 may include a wave-plate 20 so that a majority of light of second polarization 14 is rotated to light of first polarization 12, rather than randomized, and consequently transmitted through polarizer 8. Reflections inside light pipe 2 may depolarize light of second polarization 14 to a certain extent. Even so, wave-plate 20 may ensure a higher proportion of light exits polarizer 8 on the second pass.

Although these systems has been used commercially, the cost of the components is high and they require critical alignments and optical designs. As a result, there is a need for a system to perform polarization conversion with high efficiency, simple configurations and lower costs.

SUMMARY OF THE INVENTION

In one embodiment the invention includes a polarization recovery system using light pipes with a reflector having a first and a second focal points. A source of electro-magnetic radiation is disposed proximate to the first focal point of the reflector to emit rays of light that reflect from the reflector and converge substantially at the second focal point. A light pipe having an input surface with a first transmissive portion disposed proximate to the second focal point and a second reflective portion disposed distal to the second focal point and an output surface collects and transmits substantially all of the light. The output surface has a radius of curvature substantially equal to a length of the light pipe, a first focal area proximate to the first transmissive portion and a second focal area proximate to the second reflective portion. A polarizer applied to the output surface transmits the light of a first polarization and reflects the light of a second polarization toward the second reflective area, and the light of the second polarization is substantially reflected by the second reflective area toward the output surface.

BRIEF DESCRIPTION OF THE SEVERAL VIEWS OF THE DRAWINGS

FIGS. 1 and 1A show a light pipe for use with a polarization recovery system of the conventional art;

FIGS. 7a–d show various reflector configurations for use with an embodiment of the invention;

DETAILED DESCRIPTION OF THE PREFERRED EMBODIMENTS

Figure 2:
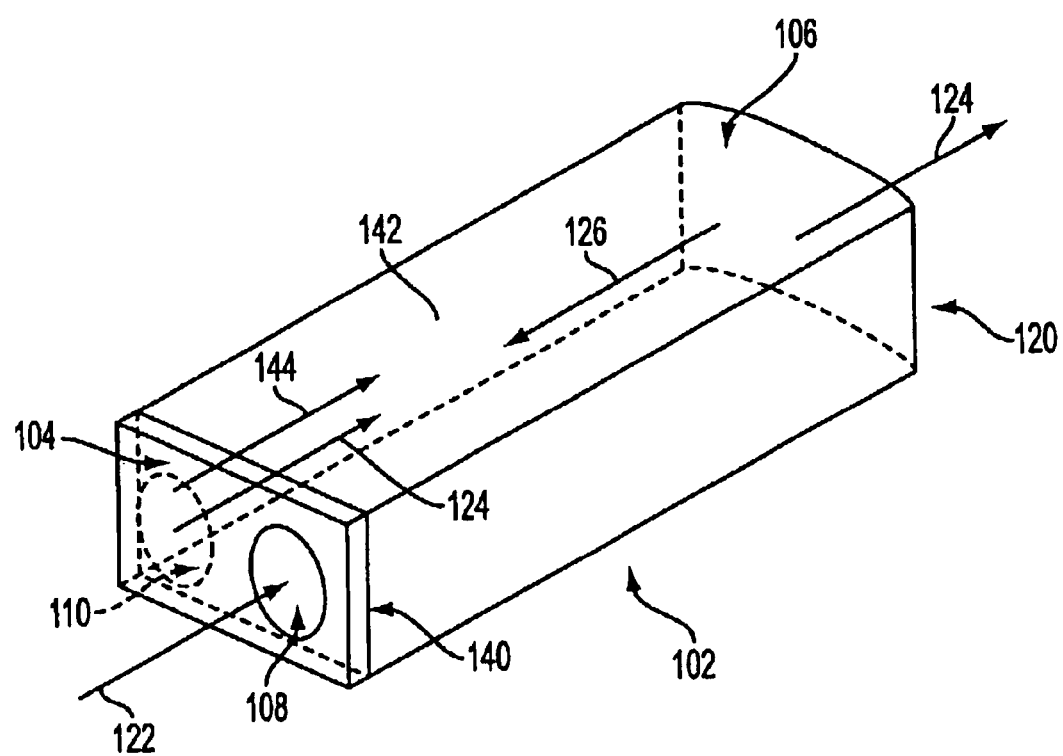
FIG. 2 shows a light pipe for use with a polarization recovery system according to an embodiment of the invention.

In FIG. 2 is shown a light pipe 102 for use with a polarization recovery system according to an embodiment of the invention. Light pipe 102 may have an input surface 104 and an output surface 106.

Light pipe 102 may be a tapered light pipe (TLP) or a straight light pipe (SLP). Light pipe 102 may be made of quartz, glass, plastic, or acrylic. A surface of light pipe 102 may be coated such that the total internal reflection preserves the polarization. The dimensions of input surface 104 and output surface 106 may be selected such that the output numerical aperture (NA) is matched to a device receiving light from light pipe 102.

Input surface 104 may be divided into a first transmissive portion 108 and a second reflective portion 110. Light pipe 102 and first transmissive portion 108 can be designed for maximum polarized light output for the aspect ratio of a particular projection system. First transmissive portion 108 may also extend beyond a centerline of input surface 104 of light pipe 102 such that the overall efficiency is maximized, depending on the intensity profile of the input light. An area of first transmissive portion 108 may be one-half of a cross-section of light pipe 102. Such an embodiment may be suitable for an etendue limited system where the aperture is made as large as possible to collect the maximum amount of light.

In another embodiment, an area of first transmissive portion 108 is different than one-half of a cross-section of light pipe 102. Such an embodiment may be suitable for systems that are not etendue limited. In a preferred embodiment, an area of first transmissive portion 108 is smaller than one-half of a cross-section of light pipe 102. A shape of first transmissive portion 108 may be circular, oval, elliptical, octagonal, triangular, or rectangular. A shape of first transmissive portion 108 may be matched substantially to an aperture of a source of light.

A polarizer 120 may be applied to output surface 106 to collect and polarize substantially all of light 122 into a first polarization 124 and a second polarization 126. Polarizer 120 may transmit light of first polarization 124 and reflect light of a second polarization 126. Light of a second polarization 126 may be reflected back towards second reflective portion 110. Light of first polarization 124 may be p-polarized light, while light of second polarization 126 may be s-polarized light. The order of polarizations may, of course, be reversed. In one embodiment, polarizer 120 may be a wire-grid polarizer.

A polarizer 120 might be used with an image projection system of a type that required polarized light, such as an LCOS imager. In this case, if the image projection system were constructed and arranged to utilize light of first polarization 124, light of first polarization 130 may be transmitted to the image projection system while light of second polarization 126, which is unusable by the image projection system directly, may be substantially reflected back towards second reflective portion 110.

Second reflective portion 110 may consist of simply a mirror, or a mirror in combination with a wave plate 140. Second reflective portion 110 may also be coated with a reflective coating in combination with a retardation coating such that a polarization of light of second polarization 126 is randomly polarized or rotated to match that of a polarizer 120.

Wave plate 140 may also be disposed in a path of light of second polarization 126. Wave plate 140 may be disposed proximate to an interior 142 of light pipe 102 if light pipe 102 were hollow. In the alternative, wave plate 140 may be disposed proximate to a surface of second reflective portion 110.

Wave plate 140 may be a half-wave plate, a quarter-wave plate, or of any other thickness as required to maximize the output of the system. In a preferred embodiment, wave plate 140 may be a quarter-wave plate. If wave plate 140 were a quarter-wave plate, light of second polarization 126 will be circularly polarized as it passes through wave plate 140, producing circularly polarized light 144. Circularly polarized light 144 may then be substantially reflected by second reflective portion 110 and pass through wave plate 140 again, producing light of first polarization 130 which exits light pipe 2 at polarizer 120.

Wave plate 140 need not cover any part of transmission portion 108. If it did, wave plate 140 would provide no net change to light 122 since light 122 is unpolarized.

Figure 3:
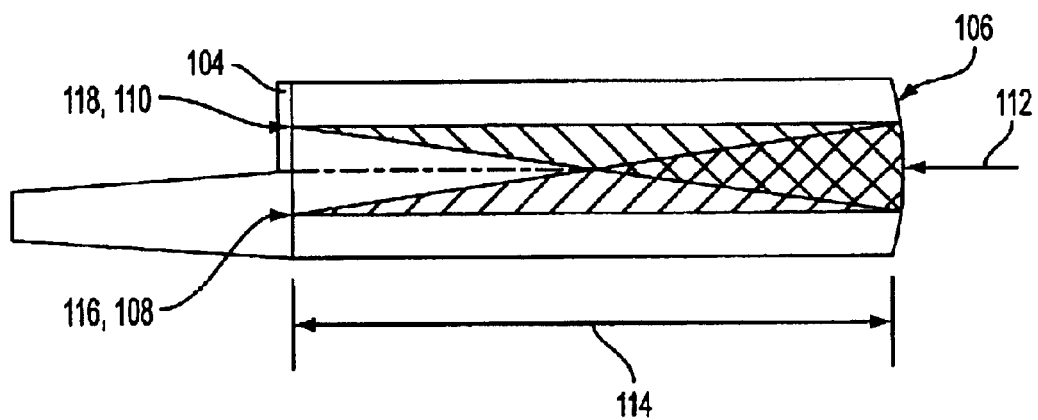
FIG. 3 shows a schematic diagram of the light pipe shown in FIG. 2.

Output surface 106 may have a radius of curvature 112 substantially equal to a length 114 of light pipe 102, as shown in FIG. 3. Input surface 104 may also have a first focal area 116 proximate to first transmissive portion 108 and a second focal area 118 proximate to second reflective portion 110. Light entering light pipe 102 at first transmissive portion 108 and reflected by polarizer 120 will thus be reflected back toward second reflective portion 110. A curvature of output surface 106 may be cylindrical or spherical.

For a spherical output surface 106, substantially all light entering light pipe 102 at first transmissive portion 108 will be imaged across an axis of output surface 106 such that all the light falls onto second reflective portion 110. For a cylindrical output surface 106, light entering light pipe 102 at first transmissive portion 108 normal to an axis of curvature of output surface 106 will be imaged across an axis of such that all the light falls onto second reflective portion 110.

If an efficiency of polarizer 120 is again 50%, one half of light entering light pipe 102 at first transmissive portion 108 will be transmitted as light of first polarization 130, while the other half is reflected and imaged on second reflective portion 110 as light of second polarization 126. The output from the first pass is thus one half.

If a reflectivity of second reflective portion 110 is 100%, substantially all of the light of second polarization 126 that is imaged onto second reflective portion 110 will be reflected at second reflective portion 110 and returned to polarizer 120 again. If second reflective portion 110 randomly polarizes light incident on its surface, light of second polarization 126 will be reflected towards polarizer 120 as randomly polarized light. Half of randomly polarized light will be polarized and exit the output end 106. The total efficiency of the system will thus be 75%, which is higher than the system of the conventional art.

If the polarization of light of second polarization 126 reflected at second reflective portion 110 is rotated to match that of polarizer 120, rather than simply randomly polarized, an ideal efficiency of the system will approach 100%. This is to be contrasted with the ideal efficiency of the conventional system, which was 66%.

Figure 4:
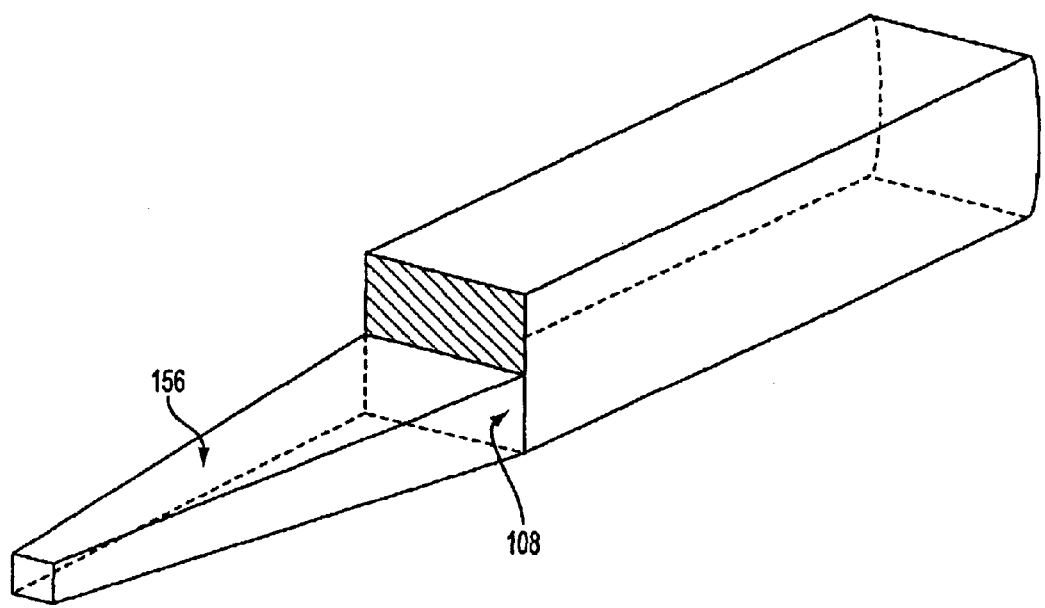
FIG. 4 shows a three-quarter view of the light pipe shown in FIG. 2.

An input light pipe 156, as shown in FIG. 4, may be used to couple light from a source into first transmissive portion 108. Input light pipe 156 may be straight or tapered, and may be used to match a NA of the source to the NA of first transmissive portion 108. Input light pipe 156 may have an entrance surface 162 and an exit surface 164. Input light pipe 156 may be a SLP or a TLP.

Figure 5:
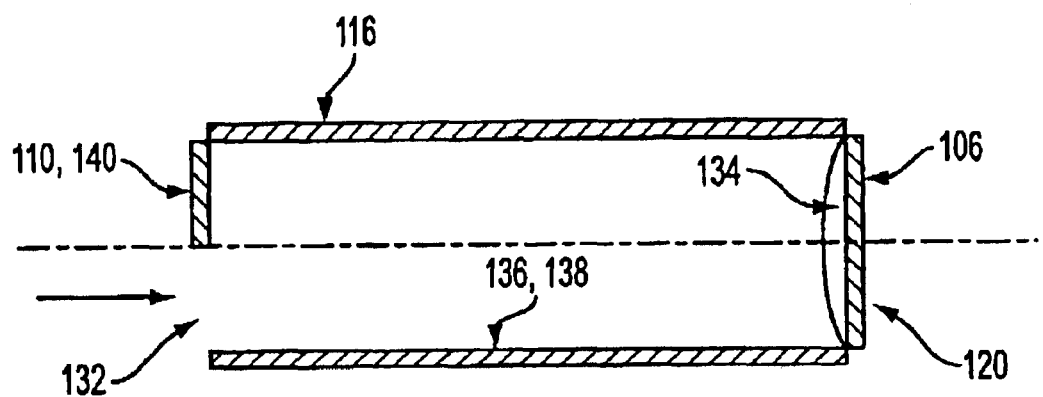
FIG. 5 shows a hollow light pipe for use with a polarization recovery system according to an embodiment of the invention.

A light pipe 116 may be hollow, as shown in FIG. 5, in which case first transmissive portion 108 may be an aperture 132. Output surface 106 may be a plano-convex lens 134 with polarizer 120 applied to a planar surface of lens 134. The convex surface of lens 134 may be spherical or cylindrical depending on the final configuration and cost of the components. The power of lens 134 is designed such that the light from aperture 132 is imaged onto second reflective portion 110. An inner surface 136 of light pipe 102 may be coated with a polarization preserving material 138.

Figure 6:
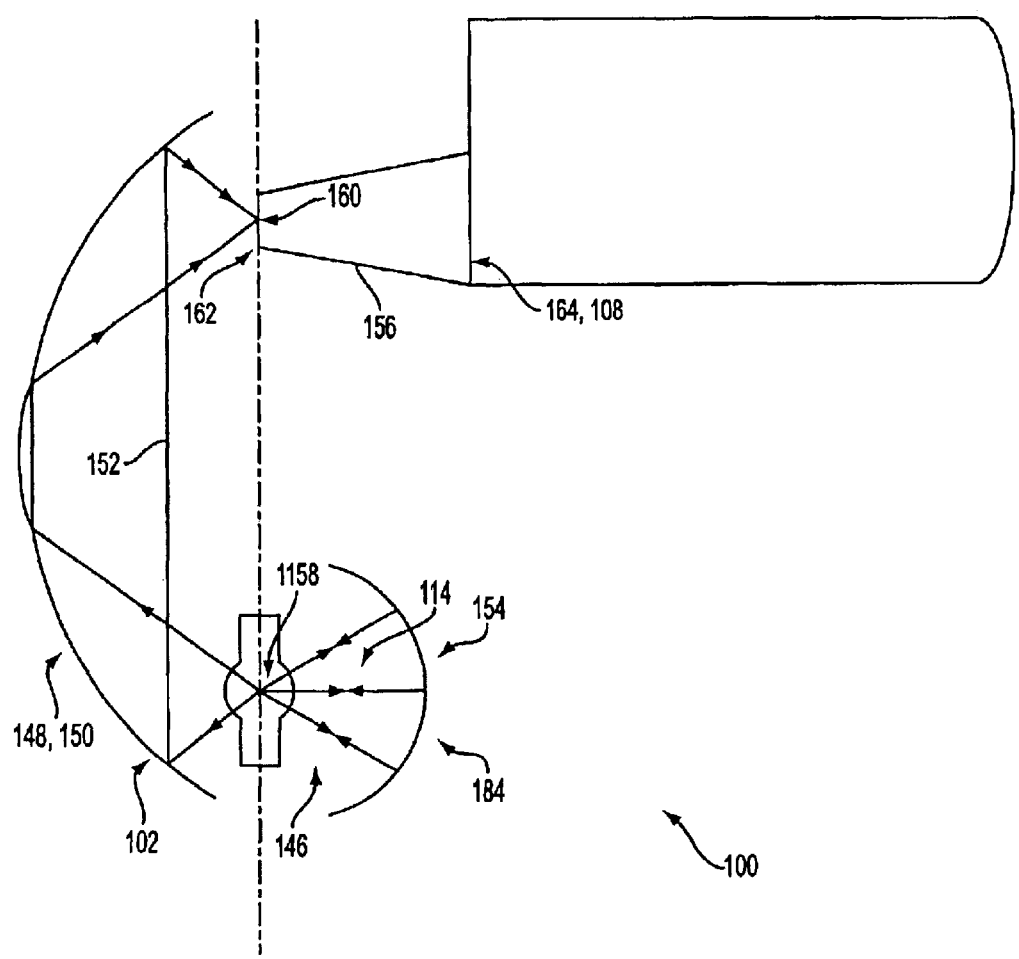
FIG. 6 shows a parabolic reflector configuration according to a first embodiment of the invention.
Figure 7A:
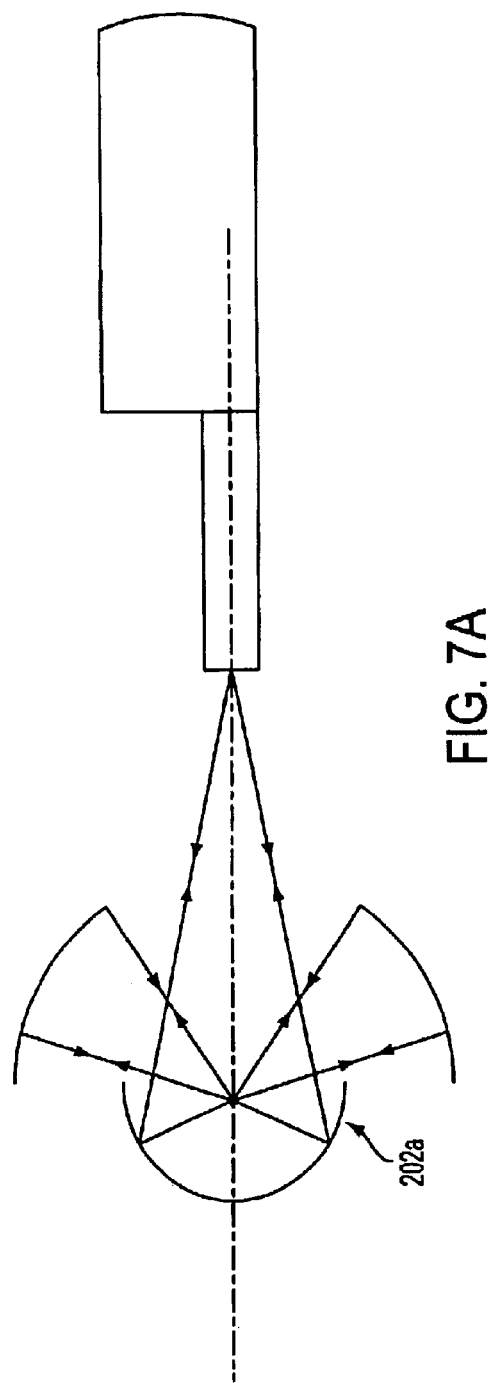
Figure 7B:
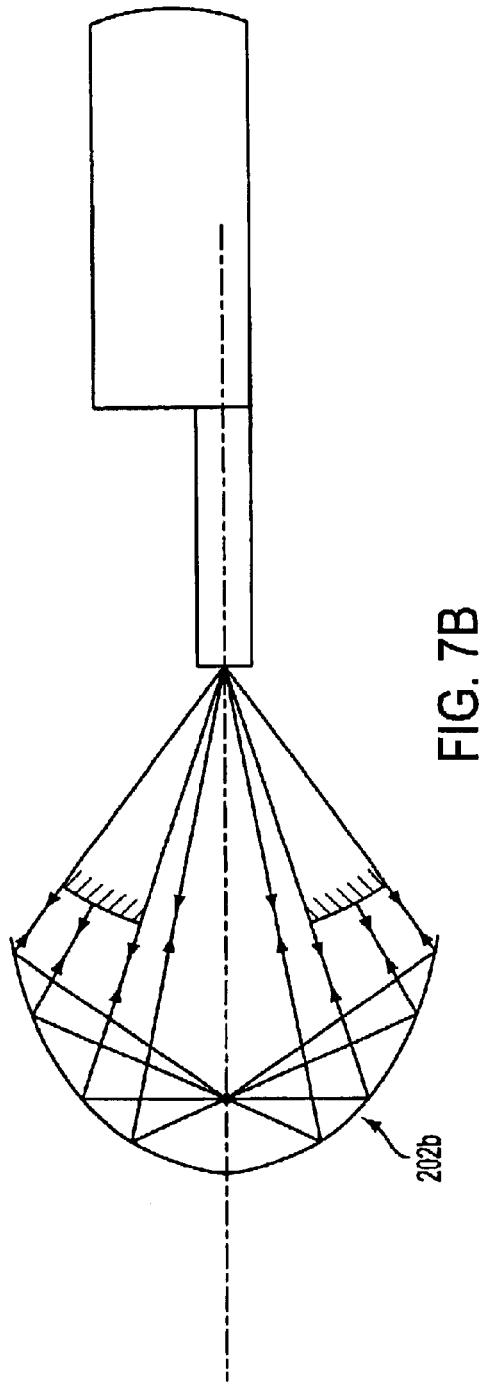

A polarization recovery system 100 according to a first embodiment of the invention is shown in FIG. 6. Polarization recovery system 100 includes a reflector 148 having first and second focal points 158, 160. Reflector 148 may have a coating 150 that reflects only a pre-specified portion of the electro-magnetic radiation spectrum. Coating 150 may reflect infrared light, visible light, a pre-specified band of wavelengths of light, a specific color of light, or some combination thereof. In an alternative embodiment, coating 150 may transmit infrared light or ultraviolet light instead of reflecting them. This might be used to discard unusable non-visible light before it is coupled into an imager.

A source 146 of electro-magnetic radiation 152 is disposed proximate to first focal point 158 of reflector 148 to emit rays of electro-magnetic radiation 152 that reflect from reflector 148 and converge substantially at second focal point 160. In one embodiment, source 146 of electro-magnetic radiation 152 may be an arc lamp, such as, a xenon lamp, a metal halide lamp, a high intensity discharge (HID) lamp, or a mercury lamp. In another embodiment, source 146 of electro-magnetic radiation 152 may be, a halogen lamp, or a filament lamp.

Entrance surface 162 of tapered light pipe 156 may be disposed proximate to second focal point 160 to collect and transmit substantially all of light 152. First transmissive portion 108 may in turn be disposed proximate to exit surface 164 to receive substantially all of light 152.

A retro-reflector 154 may be disposed opposite reflector 148 to reflect at least a portion 114 of electro-magnetic radiation 152 that does not impinge directly on reflector 148 toward reflector 148 through first focal point 158 of reflector 148 to increase the flux intensity of the converging rays. Retro-reflector 154 may be, a spherical retro-reflector 154 disposed on a side of source 146 opposite reflector 148. In one embodiment, retro-reflector 154 is integral to reflector 148. In another embodiment, retro-reflector 154 has a coating 184 that reflects only a pre-specified portion of the electro-magnetic radiation spectrum. Coating 184 may reflect, infrared light, visible light, a pre-specified band of wavelengths of light, a specific color of light, or some combination thereof.

In FIGS. 7a–d are shown various configurations of reflectors 202 that may also be used with an embodiment of the invention. Reflector 202 could be a portion of a substantially elliptical surface of revolution 202a, a portion of a substantially parabolic surface of revolution 202b, a portion of a substantially spherical surface of revolution 202c, or a portion of a substantially toric surface of revolution 202d.

Figure 8:
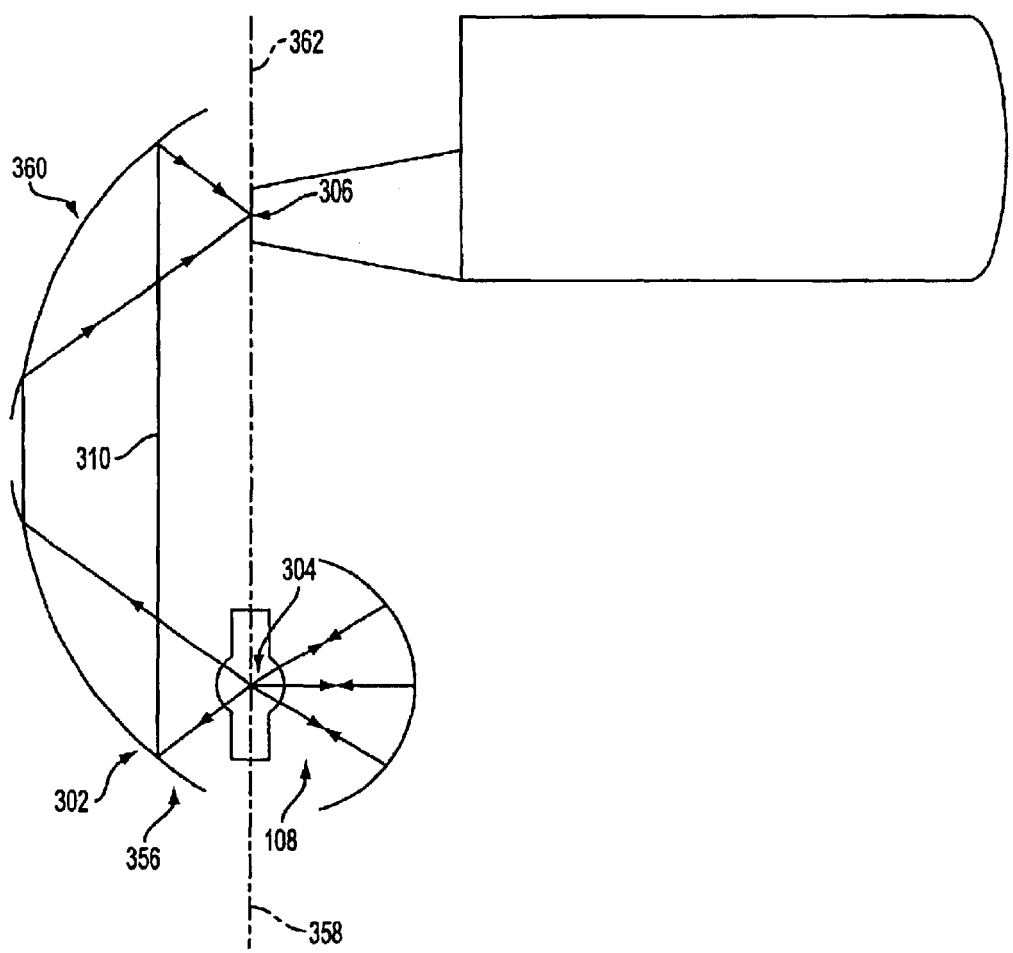
FIG. 8 shows a schematic diagram of a polarization recovery system according to a second embodiment of the invention.

In a second embodiment, shown in FIG. 8, reflector 302 may be composed of, a primary reflector 356 having a first optical axis 358 and a secondary reflector 360 having a second optical axis 362. Secondary reflector 360 may be placed substantially symmetrically to primary reflector 356, with first optical axis 358 being substantially co-linear with second optical axis 362. First focal point 304 is a focal point of primary reflector 356 while second focal point 306 is a focal point of secondary reflector 360. Rays of light 310 reflect from primary reflector 356 toward secondary reflector 360 and converge substantially at second focal point 306.

In one embodiment, primary and secondary reflectors 356, 360 may comprise, at least a portion of a substantially elliptical surface of revolution or a substantially parabolic surface of revolution. In another embodiment, primary reflector 356 may comprise, at least a portion of a substantially elliptical surface of revolution while secondary reflector 360 may comprise, at least a portion of a substantially hyperbolic surface of revolution. In a further embodiment, primary reflector 356 may comprise, at least a portion of a substantially hyperbolic surface of revolution while secondary reflector 360 may comprise, at least a portion of a substantially elliptical surface of revolution.

Figure 9:
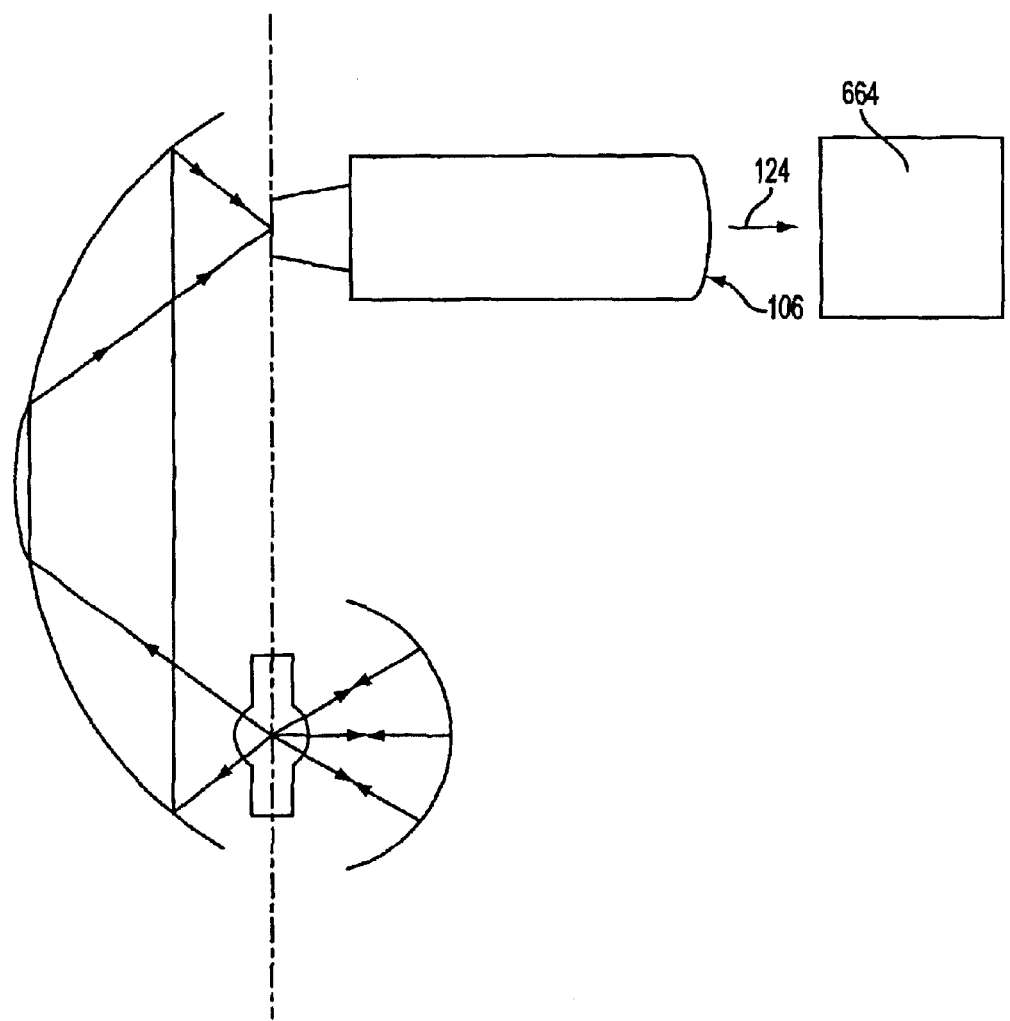
FIG. 9 shows a schematic diagram of a polarization recovery system according to a third embodiment of the invention.

In a third embodiment of the invention, as shown in FIG. 9, an image projection system 664 may be disposed proximate to output surface 106 to collect substantially all of light of first polarization 130. Image projection system 664 may be, a liquid crystal on silicon (LCOS) imager, a digital micromirror device (DMD) chip, or a transmissive liquid crystal display (LCD) panel.

Figure 10A:
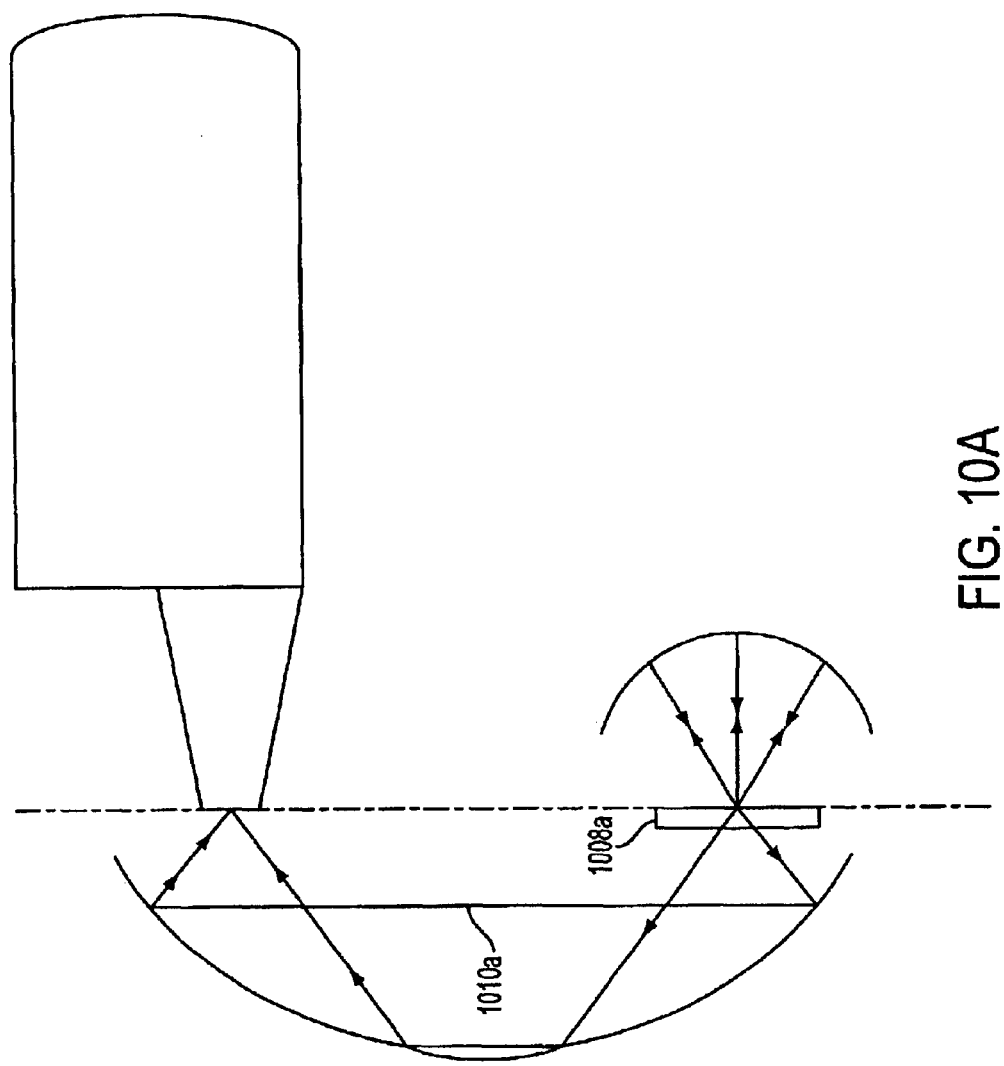
FIGS. 10a–c show various sources of light for use with an embodiment of the invention.

In FIG. 10a is shown a source 1008a of electro-magnetic radiation 1010a which may be used with an embodiment of the invention. Source 1008a may be, a single-chip source of electro-magnetic radiation, such as an LED emitting one range of bandwidths of light, such as, white light.

Figure 10B:
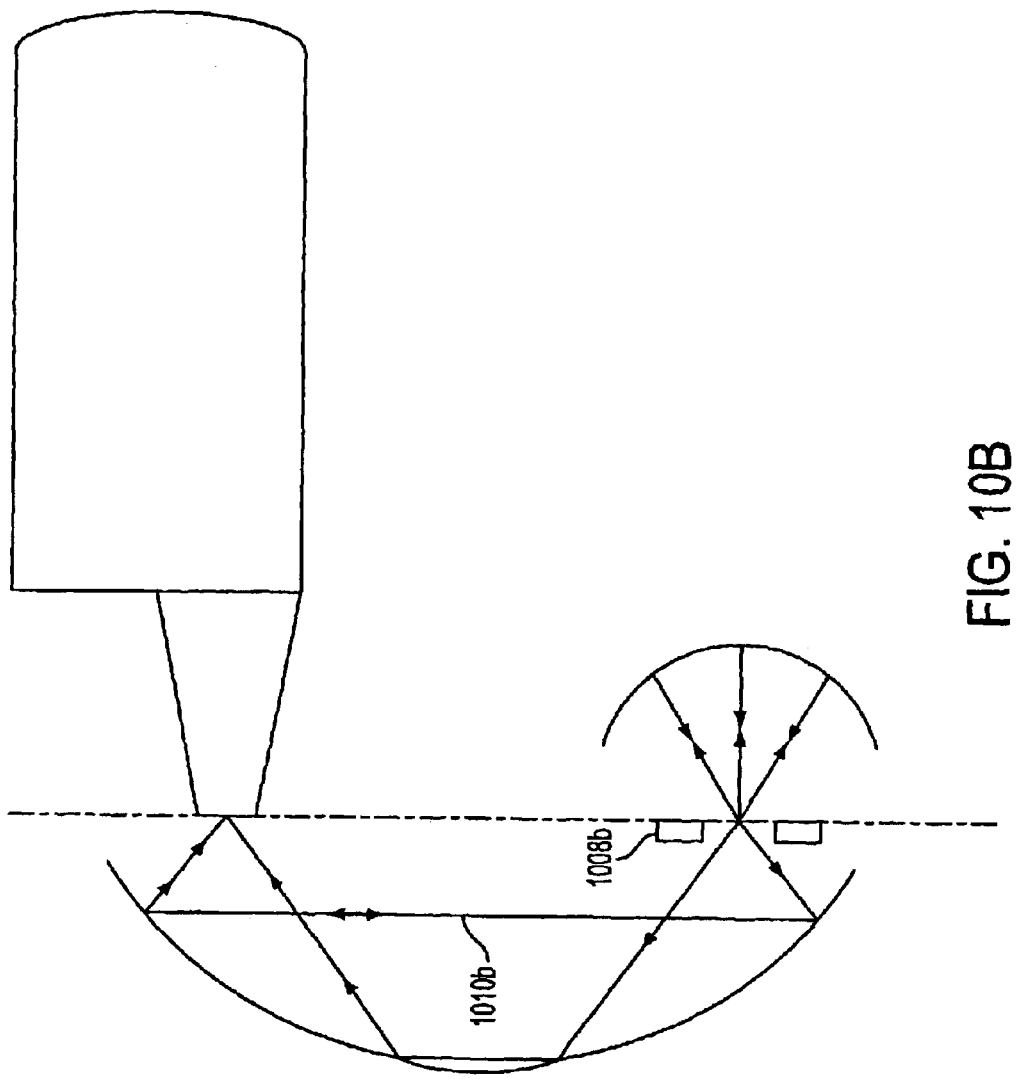

In FIG. 10b is shown a source 1008b of electro-magnetic radiation 1010b which may be used with an embodiment of the invention. Source 1008b of electro-magnetic radiation 1010b may also be, a double-chip source of electro-magnetic radiation, such as two LEDs emitting two ranges of bandwidths of light, such as, red and blue light, as shown in FIG. 10b.

Figure 10C:
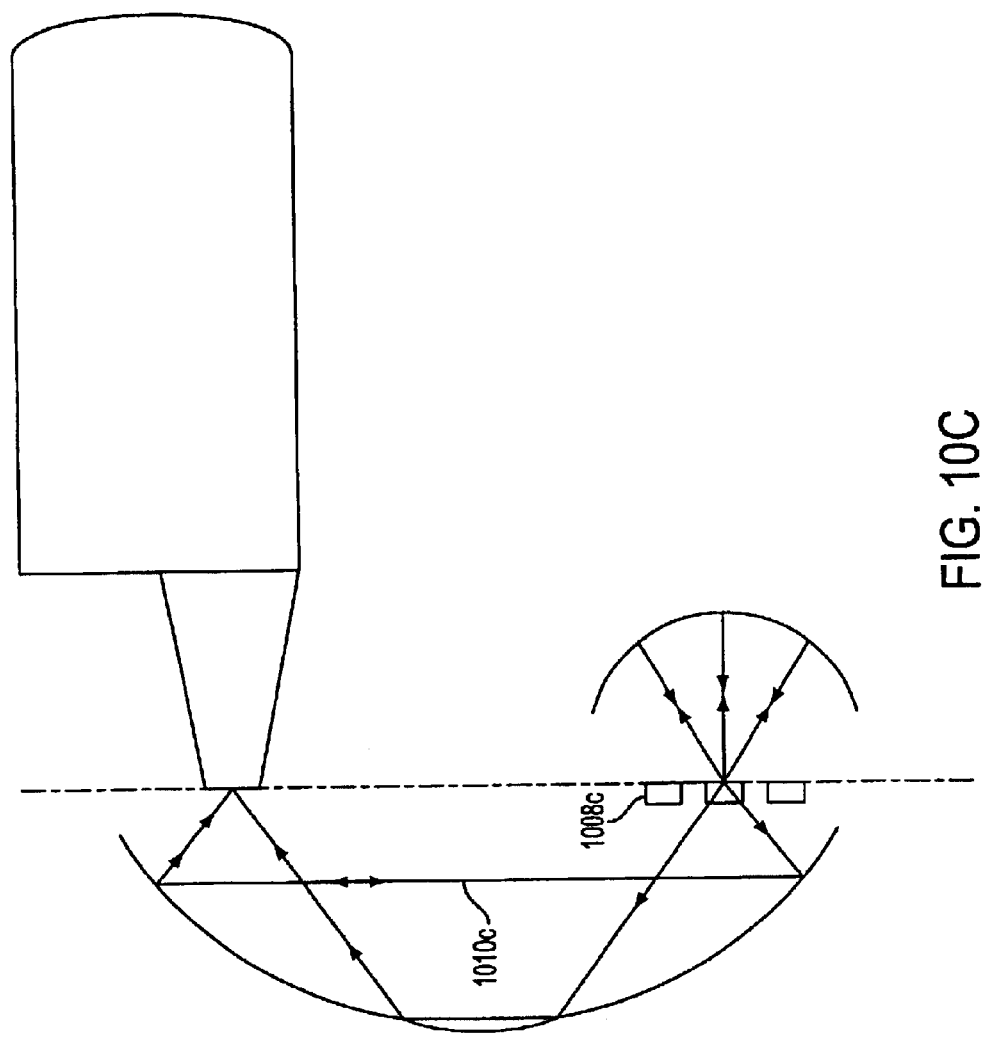

In FIG. 10c is shown a source 1008c of electro-magnetic radiation 1010c which may be used with an embodiment of the invention. Source 1008c of electro-magnetic radiation 1010c may also be, a triple-chip source of electro-magnetic radiation, such as three LEDs emitting three ranges of bandwidths of light, such as, red, green, and blue light, as shown in FIG. 10c.

Figure 11:
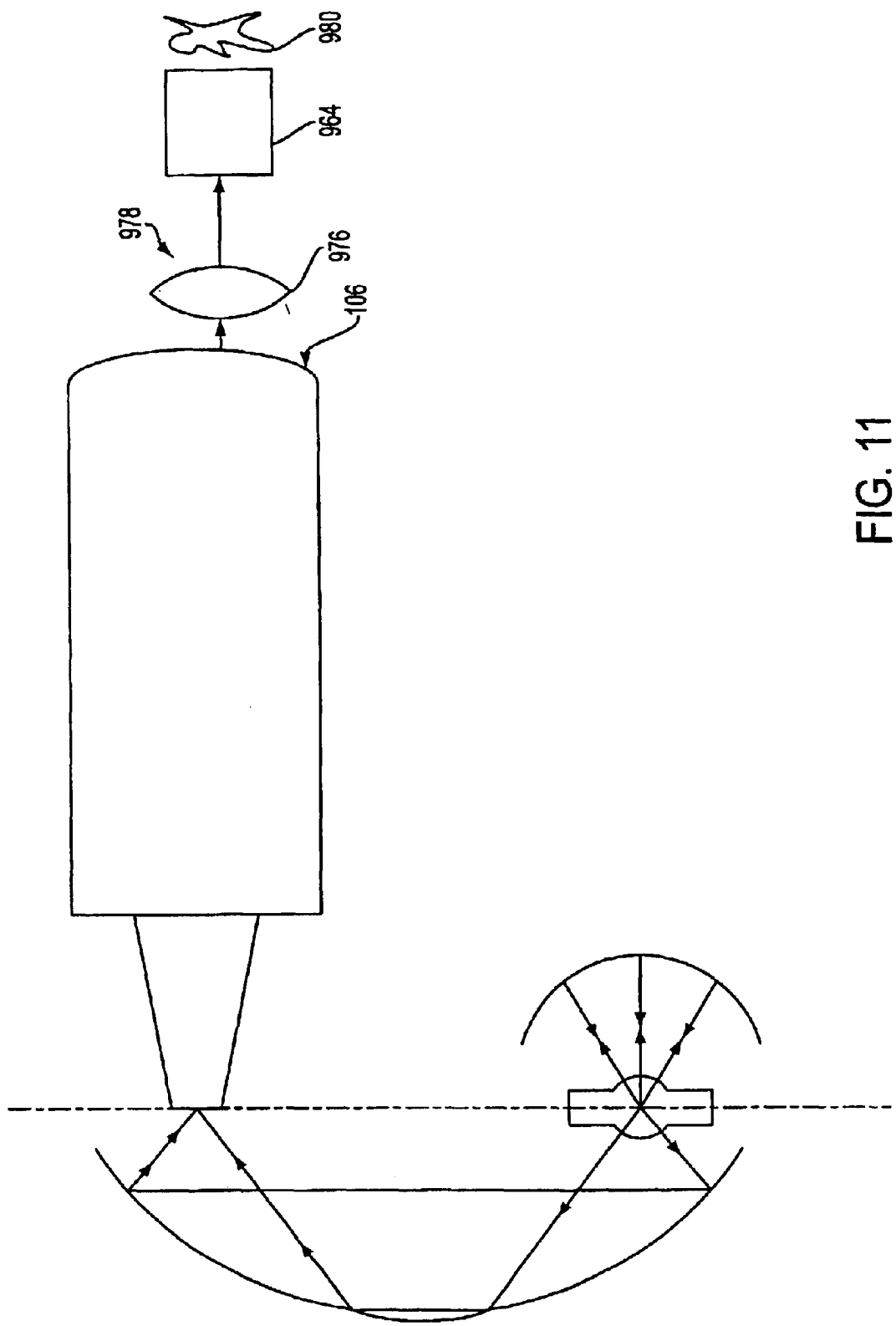
FIG. 11 shows a schematic diagram of a polarization recovery system according to a fourth embodiment of the invention.

In a fourth embodiment of the invention, as shown in FIG. 11, a focusing lens 976 may be disposed proximate to an output surface 106, with image projection system 964 disposed proximate to an output side 978 of focusing lens 976. An image 980 illuminated by light of first polarization 130 collected and focused at focusing lens 976 will be released by the projection system 964 to display the image 980.

An fifth embodiment of the invention includes a method of polarization recovery composed of the steps of positioning a source of electro-magnetic radiation at a first focal point of a reflector; producing rays of light by the source; reflecting a portion of those rays of light by a reflector toward a second focal point; converging substantially the rays of light at the second focal point; positioning a light pipe having an input surface and an output surface so a first transmissive portion of the input surface is substantially proximate to the second focal point; collecting substantially the rays of light at the first transmissive portion; passing the rays of light through the light pipe to the output surface; positioning a polarizer proximate to the output surface; polarizing substantially the rays of light into light of a first polarization and light of a second polarization; transmitting substantially the light of the first polarization; reflecting substantially the light of the second polarization through the light pipe toward a second reflective portion of the input surface; containing substantially all of the reflected light, substantially circularly polarizing the light of the second polarization with a wave plate; reflecting substantially the circularly polarized light toward the output surface; passing the circularly polarized light through the light pipe; polarizing substantially the circularly polarized light into light of the first polarization; and outputting substantially the light of the first polarization from the output surface of the light pipe.

In another embodiment, the polarized light reflected from the reflective portion of the input surface will have the polarization rotated by a wave plate to match the output polarizer.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A polarization recovery system using light pipes comprising:

a light pipe having an input surface and an output surface, said input surface having a first transmissive portion and a second reflective portion;

said output surface having a radius of curvature substantially equal to a length of said light pipe, a first focal area proximate to said first transmissive portion, and a second focal area proximate to said second reflective portion;

a polarizer applied to said output surface, said polarizer transmitting a light of a first polarization and reflecting a light of a second polarization toward said second reflective portion; and wherein said light of said second polarization is substantially reflected by said second reflective portion toward said output surface.

2. The polarization recovery system of claim 1, comprising further:

a reflector having a first and a second focal points;

a source of electro-magnetic radiation disposed proximate to said first focal point of said reflector to emit rays of light that reflect from said reflector and converge substantially at said second focal point;

wherein said first transmissive portion is disposed proximate to said second focal point to collect and transmit substantially all of said light.

3. The polarization recovery system of claim 2, wherein said reflector comprises at least a portion of a substantially elliptical surface of revolution.

4. The polarization recovery system of claim 2, wherein said reflector comprises at least a portion of a substantially spherical surface of revolution.

5. The polarization recovery system of claim 2, wherein said reflector comprises at least a portion of a substantially toric surface of revolution.

6. The polarization recovery system of claim 2, wherein said reflector comprises a primary reflector having a first optical axis, and said first focal point is a focal point of said primary reflector, said reflector comprising further:

a secondary reflector having a second optical axis placed substantially symmetrically to said primary reflector such that said first and second optical axes are substantially collinear, and wherein said second focal point is a focal point of said secondary reflector; and wherein said rays of light reflect from said primary reflector toward said secondary reflector and converge substantially at said second focal point.

7. The polarization recovery system of claim 6, wherein said primary and secondary reflectors each comprise at least a portion of a substantially elliptical surface of revolution.

8. The polarization recovery system of claim 6, wherein said primary and secondary reflectors each comprise at least a portion of a substantially parabolic surface of revolution.

9. The polarization recovery system of claim 6, wherein:

said primary reflector comprises at least a portion of a substantially elliptical surface of revolution; and said secondary reflector comprises at least a portion of a substantially hyperbolic surface of revolution.

10. The polarization recovery system of claim 6, wherein:

said primary reflector comprises at least a portion of a substantially hyperbolic surface of revolution; and said secondary reflector comprises at least a portion of a substantially elliptical surface of revolution.

11. The polarization recovery system of claim 2, wherein said reflector has a coating that reflects only a pre-specified portion of the electro-magnetic radiation spectrum.

12. The polarization recovery system of claim 11, wherein said pre-specified portion is selected from the group consisting of:

infrared light,
visible light,
a pre-specified band of wavelengths of light,
a specific color of light, and
a combination thereof.

13. The polarization recovery system of claim 2, further comprising a retro-reflector disposed on a side of said source opposite said reflector.

14. The polarization recovery system of claim 13, wherein said retro-reflector comprises a spherical retro-reflector.

15. The polarization recovery system of claim 13, wherein said retro-reflector has a coating that reflects only a pre-specified portion of the electro-magnetic radiation spectrum.

16. The polarization recovery system of claim 13, wherein said pre-specified portion is selected from the group consisting of:
infrared light,
visible light,
a pre-specified band of wavelengths of light,
a specific color of light, and
a combination thereof.

17. The polarization recovery system of claim 13, wherein said coating transmits light selected from the group consisting of:
infrared light, and
ultraviolet light.

18. The polarization recovery system of claim 2, wherein said source of electro-magnetic radiation is selected from the group consisting of:
a single-chip;
a double-chip; and
a triple-chip.

19. The polarization recovery system of claim 2, wherein said source of electro-magnetic radiation comprises an arc lamp.

20. The polarization recovery system of claim 19, wherein said arc lamp comprises a lamp selected from the group consisting of a xenon lamp, a metal halide lamp, a UHP lamp, a HID lamp, or a mercury lamp.

21. The polarization recovery system of claim 2, wherein said source of electro-magnetic radiation is selected from the group consisting of a halogen lamp, and a filament lamp.

22. The polarization recovery system of claim 2, comprising further:
an image projection system disposed proximate to said output surface to collect substantially all of said light.

23. The polarization recovery system of claim 22, wherein said image projection system is selected from the group consisting of:
an LCOS imager,
a DMD chip, and
a transmissive LCD panel.

24. The polarization recovery system of claim 2, comprising further:
an input light pipe disposed between said second focal point and said first transmissive portion, said input light pipe having an entrance surface disposed proximate to said second focal point to collect and transmit substantially all of said light and an exit surface disposed proximate to said first transmissive portion to emit substantially all of said light.

25. The polarization recovery system of claim 24, wherein said input light pipe is selected from the group consisting of:
an SLP, and
a TLP.

26. The polarization recovery system of claim 2, wherein a shape of said first transmissive portion is matched substantially to an aperture of said source of light.

27. The polarization recovery system of claim 1, wherein said light pipe is hollow; and
said first transmissive portion comprises an aperture;
said output surface comprises a plano-convex lens; and
wherein said polarizer is applied to a planar surface of said lens.

28. The polarization recovery system of claim 27, wherein an inner surface of said light pipe is coated with a polarization preserving material.

29. The polarization recovery system of claim 27, comprising further a retardation plate disposed in an interior of said light pipe in a path of said light of said second polarization to rotate a polarization of said light.

30. The polarization recovery system of claim 29, wherein said retardation plate is selected from the group consisting of a quarter-wave plate, a half-wave plate and harmonics thereof.

31. The polarization recovery system of claim 1, wherein said second reflective area comprises further a wave plate to rotate said light of said second polarization to said first polarization.

32. The polarization recovery system of claim 1, wherein a curvature of said output surface is selected from the group consisting of cylindrical and spherical.

33. The polarization recovery system of claim 1, wherein said polarizer comprises a wire-grid polarizer.

34. The polarization recovery system of claim 1, wherein a shape of said first transmissive portion is selected from the group consisting of circular, oval, elliptical, octagonal, triangular, and rectangular.

35. The polarization recovery system of claim 1, wherein said light pipe is comprised of a material selected from the group consisting of quartz, glass, plastic, or acrylic.

36. The polarization recovery system of claim 1, wherein said light pipe is selected from the group consisting of:
an SLP, and
a TLP.

37. A method of polarization recovery comprising the steps of:
positioning a source of electro-magnetic radiation at a first focal point of a reflector;
producing rays of light by said source;
reflecting a portion of said rays of light by said reflector toward a second focal point;
converging substantially said rays of light at said second focal point;
positioning an output light pipe having an input surface and an output surface so a first transmissive portion of said input surface is substantially proximate to said second focal point;
collecting substantially said rays of light at said first transmissive portion;
passing said rays of light through said output light pipe to said output surface;
positioning a polarizer proximate to said output surface;
polarizing substantially said rays of light into light of a first polarization and light of a second polarization;
transmitting substantially said light of said first polarization;
reflecting substantially said light of said second polarization through said light pipe toward a second reflective portion of said input surface;

circularly polarizing substantially said light of said second polarization with a wave plate;

reflecting substantially said circularly polarized light toward said output surface;

passing said circularly polarized light through said output light pipe;

polarizing substantially said circularly polarized light into light of said first polarization; and outputting substantially light of said first polarization from said output surface of said output light pipe.

* * * * *